(No Model.)

W. J. BURGESS.
FILTER.

No. 285,965. Patented Oct. 2, 1883.

Attest:
F. H. Schott
A. R. Brown

Inventor.
William J. Burgess

UNITED STATES PATENT OFFICE.

WILLIAM J. BURGESS, OF EVERETT, MASSACHUSETTS.

FILTER.

SPECIFICATION forming part of Letters Patent No. 285,965, dated October 2, 1883.

Application filed March 15, 1883. (No model.)

*To all whom it may concern:*

Be it known that I, WILLIAM J. BURGESS, a citizen of the United States, residing at Everett, in the county of Middlesex and State of Massachusetts, have invented certain new and useful Improvements in Filters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to filters or percolators for pharmaceutical purposes; and it consists in the construction of parts, as hereinafter more fully described and claimed.

Figure 1:
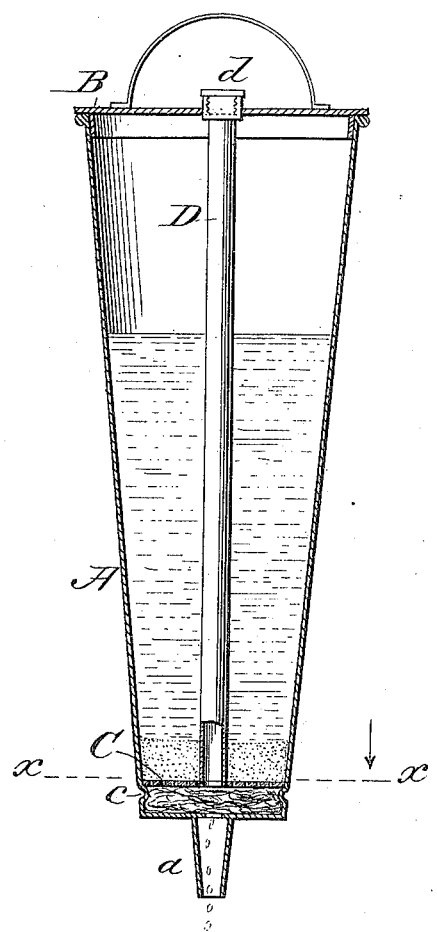
Figure 2:
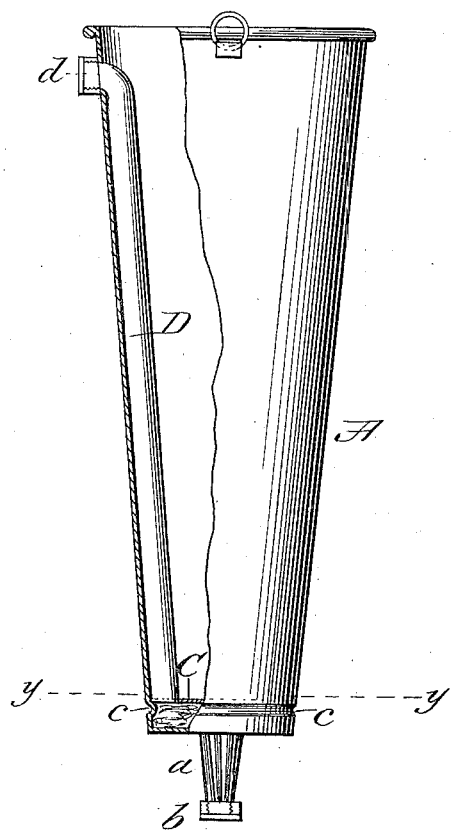
Figure 3:
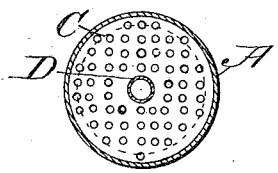
Figure 4:
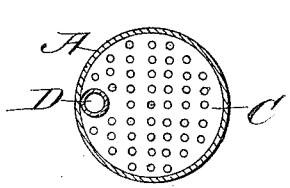

Figure 1 is a vertical section of my improved filter or percolator. Fig. 2 is a sectional side elevation, representing a modified form of the filter. Fig. 3 is a section on the line $x$ $x$ of Fig. 1, and Fig. 4 is a section on the line $y$ $y$ of Fig. 2.

Like letters indicate like parts.

The letter A designates a filtering-vessel composed of any suitable material and made of any convenient size or shape. This vessel is provided with a cover, B, and at its lower end is an outlet-tube, $a$, that is preferably arranged in the center, and provided with a detachable plug or cap, $b$. The lower portion of the vessel A has an annular corrugation, $c$, forming an internal shoulder for the support of a perforated partition or division plate, C. This supporting-shoulder may, however, be formed in any other convenient manner. The perforated plate or strainer C may be secured to the lower end of a removable tube, D, the upper end of which passes through the cover B, as shown in Fig. 1; or the tube D may be arranged in the side of the filtering-vessel, as shown in Fig. 2, in which case the perforated plate C will be made in the form shown in Fig. 4, so as to rest upon its support and in contact with the pipe. The upper end of the pipe or tube D, whether passed through the removable cover B, as shown in Fig. 1, or bent and passed through the side of the vessel A, as shown in Fig. 2, is provided with a detachable plug or cap, $d$. In the space beneath the perforated plate or strainer C is placed any suitable filtering material.

When using this device as a simple filter or percolator, the liquid to be filtered is placed in the vessel A and allowed to percolate through the perforated plate or strainer C and the filtering material beneath said plate, the purified liquid passing out through the tube $a$ when its plug or cap $b$ is removed. If the plug or cap $d$ of the tube or pipe D is removed during this operation, the tube D will serve as a vent, thereby facilitating the operation of filtering and enabling it to be more quickly accomplished.

In making tinctures or similar pharmaceutical preparations requiring alcohol, the ingredients may be all introduced into the vessel A by removing its cover B, or the alcohol may be poured in through the tube D, and be thus brought in contact with the liquid after it has passed through the plate C and into the filtering material, the alcohol rising through the same and into the body of the vessel, so as to mingle with its contents and extract the active principle of the medicinal substances under treatment.

Having thus described my invention, what I claim as new, and desire to secure by Letters Patent, is—

The herein-described filter, consisting of the vessel A, having a cover, B, and provided in its bottom with an outlet-tube, $a$, having a cap or stopper, $b$, the strainer C, and the tube D, extending from said strainer to the upper part of the vessel, and provided on the outer side thereof with a cap or stopper, $d$, substantially as described.

In testimony whereof I affix my signature in presence of two witnesses.

WILLIAM J. BURGESS.

Witnesses:
 A. R. BROWN,
 PHILIP MAURO.